United States Patent [19]

Ozeki

[11] Patent Number: 4,691,826
[45] Date of Patent: Sep. 8, 1987

[54] INFORMATION RECORDING CARRIER-HOLDING FRAME

[75] Inventor: Jiro Ozeki, Tokyo, Japan

[73] Assignee: Slidex Corporation, Tokyo, Japan

[21] Appl. No.: 825,898

[22] Filed: Feb. 4, 1986

[30] Foreign Application Priority Data

Nov. 26, 1985 [JP] Japan .............................. 60-263660

[51] Int. Cl.⁴ .................... B65D 1/24; B65D 85/30; B65D 85/57
[52] U.S. Cl. .................................. 206/456; 206/444; 206/454; 206/555; 40/158 B
[58] Field of Search ..................... 206/0.83, 0.84, 444, 206/455, 456, 564, 387, 804, 472, 474, 555, 454; 40/158 B, 159

[56] References Cited

U.S. PATENT DOCUMENTS

| | | | |
|---|---|---|---|
| 2,968,882 | 1/1961 | Ozeki | 206/456 |
| 3,587,841 | 6/1971 | Dercjian | 206/387 |
| 3,743,081 | 7/1973 | Roberg et al. | 206/387 |
| 4,202,122 | 5/1980 | Namiki | 40/158 B |
| 4,207,979 | 6/1980 | Brown | 206/456 |
| 4,207,980 | 6/1980 | Namiki | 206/456 |
| 4,209,923 | 7/1980 | Wendt | 40/158 B |
| 4,236,635 | 12/1980 | Namiki | 206/456 |
| 4,425,997 | 1/1984 | Grant | 206/456 |
| 4,427,727 | 1/1984 | Ozeki | 206/456 |
| 4,511,034 | 4/1985 | Pan | 206/555 |
| 4,533,049 | 8/1985 | Ozeki | 206/455 |

Primary Examiner—Stephen Marcus
Assistant Examiner—Brenda J. Ehrhardt
Attorney, Agent, or Firm—Fleit, Jacobson, Cohn & Price

[57] ABSTRACT

An information recording carrier-holding frame comprising a substantially perpendicular depression peripheral wall defining a depression with a bottom wall; planar lugs provided at at least two opposed side portions of the depression peripheral wall and projecting to the inside of the rectangular depression; and a support provided in and rising from the bottom wall and spaced from the depression peripheral wall portion opposed to the depression peripheral wall portion which is located on the insertion side of the information recording carrier and has no planar lug. An information recording carrier-holding sheet is also disclosed which comprises a plurality of such information recording carrier-holding frame laterally and vertical arrayed thereon.

7 Claims, 8 Drawing Figures

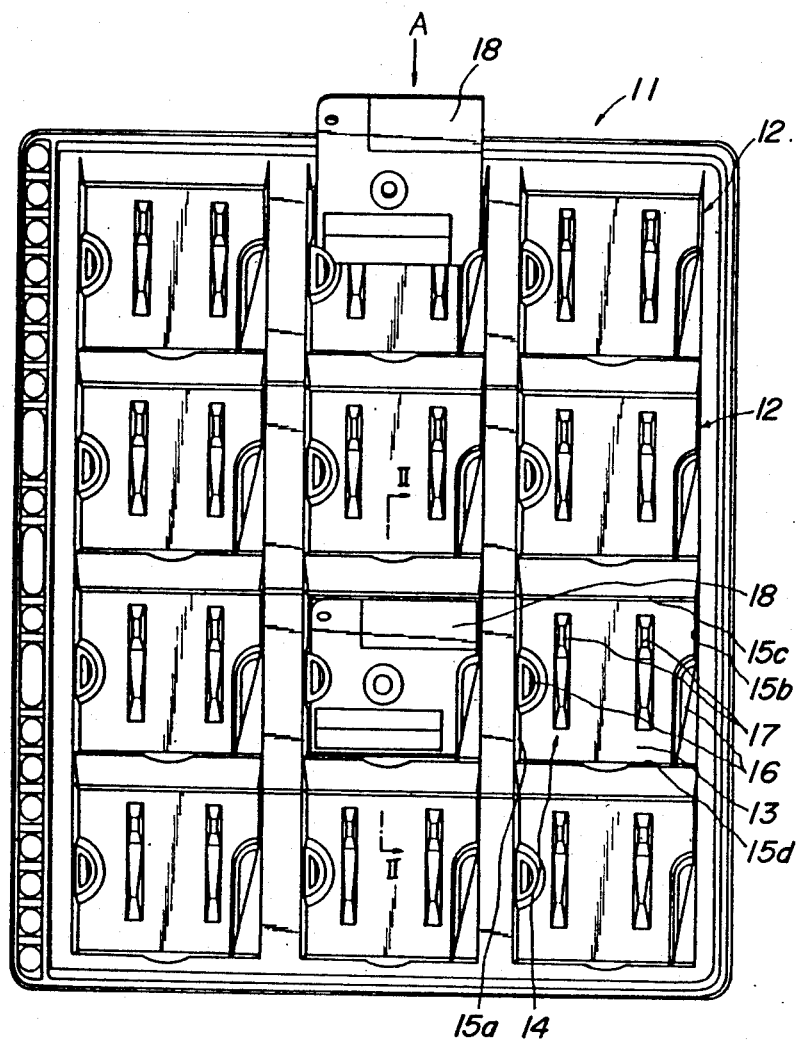
FIG_1a

FIG_1b
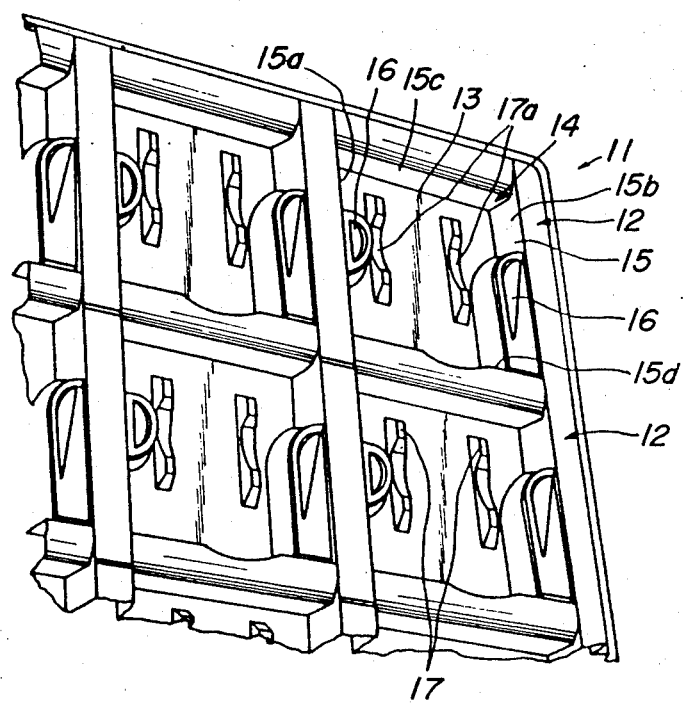

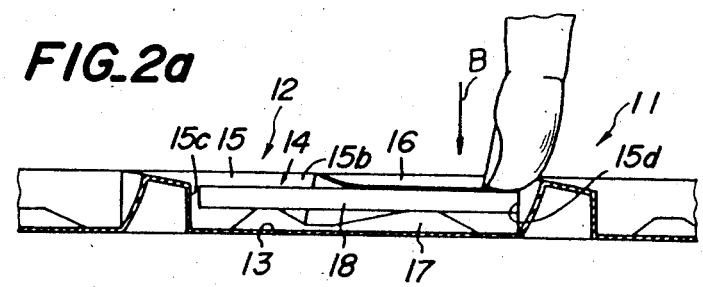
FIG_2a
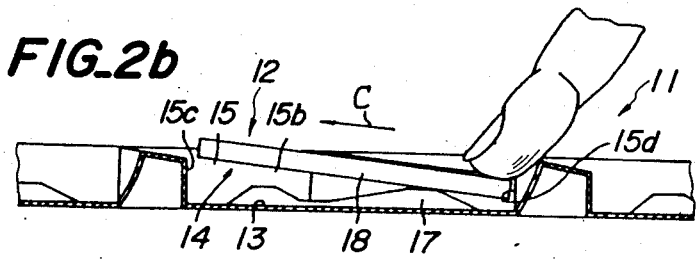
FIG_2b
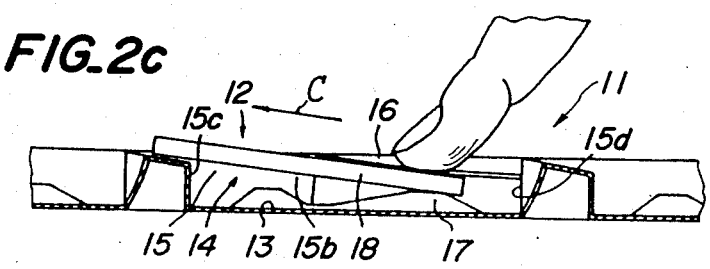
FIG_2c
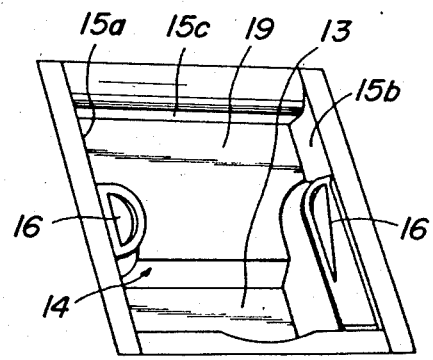
FIG_3

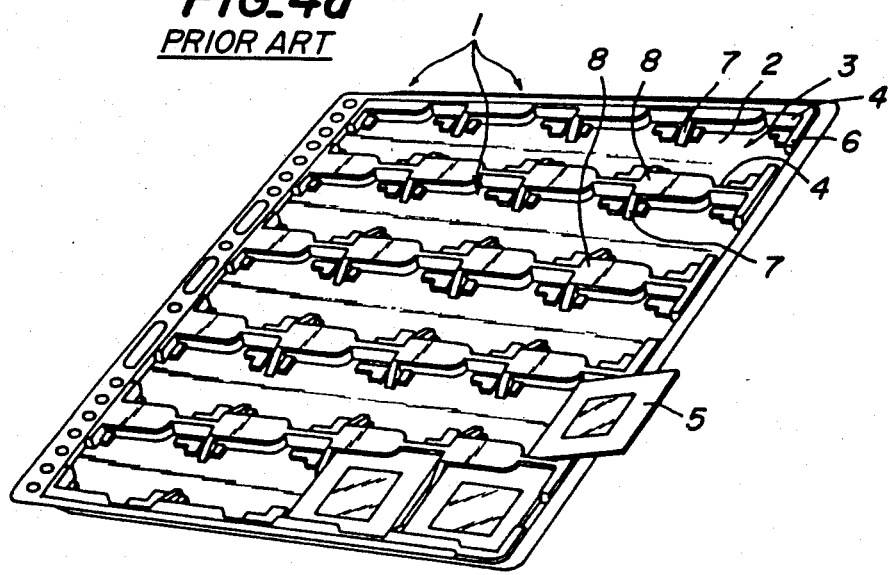
FIG_4a
PRIOR ART
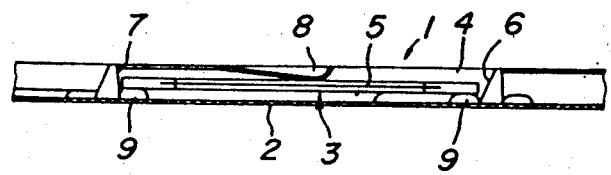
FIG_4b
PRIOR ART

INFORMATION RECORDING CARRIER-HOLDING FRAME

BACKGROUND OF THE INVENTION

1. Field of the Invention

The present invention relates to an information recording carrier-holding frame which can extremely stably house and hold a small size of a thin information recording carrier such as a floppy disk, a slide film and so on and can allow the information recording carrier to be removed from the holding frame with ease if necessary.

2. Related Art Statement

As file sheets conventionally widely used for arranging and storing paper mount-attached slide films as one of examples of the information recording carriers, there is available one as shown in FIG. 4(a).

According to this example, holding frames 1 for housing and holding mount-attached slide films of 35 mm are formed in four stages and four columns by press molding from a single hard plastic sheet. As obvious from a section view of FIG. 4(b), each of the holding frames 1 is so constituted that a rectangular depression 3 with a bottom wall 2 is defined by opposite side walls 4, 4, a partition wall 6 on the insertion side of a slide film 5 and a partition wall 7 opposed to the partition wall 6; the partition side walls 4, 4 and the partition wall 7 are provided with planar lugs 8, 8 each projecting from top portions of the respective opposite side walls to the inside of the rectangular depression 3; and angular supports 9 slightly rising upwardly at four corners of the bottom walls 2 are formed for supporting the slide film 5.

In the illustrated embodiment, the partition wall 6 on the insertion side and the partition wall 7 are discontinued at the central portions thereof for the purpose of facilitating the insertion of the slide film 5 held by two fingers into the rectangular depression 3 and removal of the slide film 5 therefrom, and the partition wall 6 on the insertion side is designed as an upwardly inclined face.

The slide film 5 is inserted into each of the thus constituted holding frames such that as shown in FIG. 4(a), one end of the slide film is positioned in the rectangular depression from the side of the partition wall 6, and then the slide film is pushed thereinto until the other end of the slide film 5 completely enters the rectangular depression. As a result, as shown in FIG. 4(b), the slide film 5 is supported on the supports while being pressed down by the planar lugs 8 and 8.

When the slide film 5 is inserted in the rectangular depression like this, it is placed on the supports 9, so that an emulsion face of the film 5 is spaced largely from the surface of the bottom wall and the slide film 5 is pressed against the supports 9 with a large force under the action of the planar lugs 8 and 8. Therefore, the emulsion face of the film is effectively prevented from being damaged due to the deformation of the bottom wall 2 and other causes. Further, although the partition wall 6 of the insertion side is inclined, the slide film 5 is assuredly prevented from being accidentally slipped off from the rectangular depression 3.

On the other hand, the slide film is extremely easily removed from the rectangular depression 3 such that one end of the slide film 5 on the side of the partition wall 7 is pushed to make the other end of the slide film 5 ride over the partition wall 6 on the insertion side against the elastic force of the planar lugs 8 and 8, and further the other end of the slide film and the near portion thereof are caused to ride over the partition wall 6 to release the restraint of the slide film 4 by the planar lugs 8, 8.

However, according to such a conventional holding frame, the partition wall 6 on the insertion side is designed as an upwardly inclined face particularly for the purpose of facilitating the removal of the slide film 5 from the rectangular depression 3. Thus, if a small size of the floppy disk housing the information recording carrier is a plastic casing, a so-called glass mount-attached film in which a mount is attached to a slide film held between glass pieces, or the like which is considerably heavier than the paper mount-attached slide film 5 is employed as the information recording carrier and the holding frame with the above conventional structure is applied for such a considerably heavier information recording carrier, when the information recording carrier is housed and held in the holding frame while the partition wall 6 on the insertion side is directed downwardly or in addition thereto, when some vibrations act upon the holding frame, there occurs a problem that the information recording carrier is slipped off from the partition wall 6 on the insertion side due to insufficient holding force between the planar lugs 8, 8 and the supports 9.

SUMMARY OF THE INVENTION

The present invention is to advantageously solve such problems suffered by the conventional techniques.

More specifically, it is an object of the present invention to provide an information recording carrier-holding frame which sufficiently stably houses and holds an information recording carrier having even a large weight with being hardly influenced by a holding force upon the information recording carrier by a planar lugs and supports while assuredly preventing accidental slip-off of the information recording carrier from the rectangular depression, and which facilitates the removal of the information recording carrier from holding frame.

According to the present invention, a rectangular depression with a bottom wall is defined by a substantially perpendicular depression peripheral wall, planar lugs projecting to the inside of the rectangular depression are provided at at least two opposed side portions of the depression peripheral wall, and a support rising from the bottom wall for supporting the information recording carrier are provided while being spaced at a specific internal from the peripheral wall portion opposed to the depression peripheral wall portion with no planar lugs on the side of inserting the information recording carrier into the rectangular depression.

(Function)

The information recording carrier is inserted into the holding frame such that one end of the information recording carrier is positioned on a support in the rectangular depression, and the other end thereof is pushed to position the whole information recording carrier within the rectangular depression, whereby the information recording carrier is held between the planar lugs and the supports. In the state that the information recording carrier is inserted as above, even if the holding force for the information recording carrier due to the planar lugs and the supports is rather insufficient, the slide film is assuredly prevented from being accidentally slipped off from the rectangular depression under the action of the substantially perpendicular depression peripheral wall, particularly, the peripheral wall portion on the insertion side of the information recording carrier. Therefore, even if the holding frame is shooked while the peripheral wall portion on the insertion side of the information recording carrier is directed downwardly in posture, there is no fear that the information recording carrier is slipped off from the holding frame.

On the other hand, the information recording carrier housed and held in the holding frame can be extremely easily removed therefrom such that one end portion of the information recording carrier is pushed down in the vicinity of the peripheral wall portion opposed to the peripheral wall portion on the insertion side of the information recording carrier to raise the other end portion of the information recording carrier up to a high position against the elastic force of the planar lugs, and while this raised state is kept as it is, the slide film is pushed toward the other end to thereby make the other end ride over the peripheral wall portion on the inserting side of the information recording carrier and successively release the information recording carrier from the planar lugs.

These and other objects, features, and advantages of the present invention will be appreciated upon reading of the following description of the invention when taken in conjunction with the attached drawings with understanding that some modifications, variations and changes of the same could be easily done by the skilled in the art to which the invention pertains without departing from the spirit of the invention or the scope of the claims appended hereto.

BRIEF DESCRIPTION OF THE DRAWINGS

For better understanding of the invention, reference is made to the attached drawings, wherein:

FIGS. 1(a) and (b) are a plan view and a partially enlarged view of an embodiment embodying the present invention, respectively;

FIGS. 2(a) to (c) are sectional views showing steps of removing the information recording carrier;

FIG. 3 is a perspectively enlarged view showing another embodiment according to the present invention; and FIGS. 4(a) and (b) are a perspective view and a sectional view of a conventional example, respectively.

DETAILED DESCRIPTION OF THE INVENTION

The present invention will be explained more in detail with reference to embodiments illustrated in the attached drawings.

FIG. 1 is a plan view of a holding frame according to the present invention. In this figure, reference numerals 11, 12 denote the whole file sheet formed from a single plastic sheet, and holding frames laterally and vertically arrayed in the file sheet 11, respectively.

In the illustrated embodiment, a rectangular depression 14 with a bottom wall 13 is defined by a substantially perpendicular depression peripheral wall 15, and at least opposed side wall portions 15a and 15b of the depression peripheral wall 15 are provided with planar lugs 16 and 16 projecting from the tip portions of the opposed side wall portions or the near portions thereof, in the figure, from the top, to the inside of the rectangular depression 14. In the illustrated embodiment, of these planar lugs 16 and 16, the planar lugs 16 projecting from the side wall portion 15a is located in the substantially central portion of the side wall portion 15a in the longitudinal direction, while the other planar lug 16 projecting from the other side wall portion 15b is continued from the side wall portion 15b to the one of the peripheral wall portions perpendicular thereto, in other words, the end wall portion 15d opposed to the peripheral wall portion 15c on the insertion side of the information recording carrier.

In this embodiment, two rows of supports 17, 17 are provided in the bottom wall 13 while rising from the bottom wall and extending in parallel with the side wall portions 15a and 15b. The edges on the side of the end wall portions 15d of the supports 17 and 17 are spaced from the end wall portion 15d at a specific interval. Thereby, the information recording carrier held between the supports 17 and the planar lugs 16 in the rectangular depression 14, for instance, the floppy disk 18, is turned around the supports 17 as fulcrum due to a downward pushing force at the end portion thereof on the side of the end wall portion. On the other hand, the supports 17 both have enough extending length to hold the floppy disk 18 in a stable posture, and are provided with depression portions 17a and 17a at their intermediate portions for facilitating the insertion of the floppy disk 18 under the planar lugs during the initial stage of inserting the floppy disk 18 into the depression 14. The information recording carrier-holding sheet with numerous holding frames may be integrally formed from a single plastic resin sheet through molding.

The floppy disk 18 is easily inserted into each of the thus constituted holding frames 12 such that as shown in FIG. 1(a), after one of the floppy disk is positioned on the depression 17a, 17a of the supports 17, the other end is pushed toward the inside of the rectangular depression 14 as shown by an arrow A to cause the floppy disk 18 to enter the underside of the planar lugs 16 and then completely advance into the inside of the depression 14.

Since the floppy disk 18 is surrounded by the depression peripheral wall 15 which is substantially perpendicular to the bottom wall 13 in the state that the floppy disk is inserted in such a manner, even if the force of holding the floppy disk 18 by the planar lugs 16 and the supports 17 becomes slightly lacking or the weight of the floppy disk is relatively larger, the floppy disk is assuredly prevented from accidentally slipping off from the holding frame 12 irrespective of the posture of the holding frame 12.

On the other hand, the inserted floppy disk 18 is taken out from the holding frame 12 such that as shown in the sectional view of FIG. 2(a), the end portion of the floppy disk 18 on the side of the end wall portion 15d is first pushed down as shown by an arrow B to turn the floppy disk 18 around the tip edges of the supports 17 on the side of the end wall portion 15d as fulcrum as shown in FIG. 2(b) and raise the other end portion preferably at a higher position than the height of the peripheral wall portion 15c on the insertion side, and then while this raised posture is maintained, the floppy disk 18 is pushed toward the peripheral wall portion on the inertion side as shown by an arrow C to make the other end portion of the floppy disk 18 ride over the peripheral wall portion 15c on the insertion side as shown in FIG. 2(c), and the floppy disk is continuously pushed in the arrow direction C.

FIG. 3 is a view showing another embodiment according to the present invention.

In this embodiment, a support 19 which is projected from the bottom wall 13 while being spaced from the end wall portion 15d at a specific interval is continued to the opposite side wall portions 15a, 15b as well as the peripheral wall portion 15c on the insertion side. Similar effects described in connection with the previously described embodiments can be obtained by this embodiment of FIG. 3.

(Effects of the Present Invetion)

As mentioned in the foregoing, according to the present invention, even if the information recording carrier has a relatively large weight, the information recording carrier can be well stably housed and held by the action of the depression peripheral wall which is perpendicular to the bottom wall, so that the information recording carrier can be assuredly prevented from being slipping off from the rectangular depression.

In addition, the removal of the information recording carrier from the rectangular depression can be extremely easily performed by providing the support or supports rising from the bottom wall at a specific height and at the location of the support or supports specifically separated from the end wall portion.

What is claimed is:

1. An information recording carrier-holding frame comprising:
   a file sheet including a substantially perpendicular depression peripheral wall defining a rectangular depression having a bottom wall and four side walls;
   planar lugs projecting inwardly from two of said four side walls, said two side walls being opposed to each other;
   support means rising from said bottom wall for supporting an information recording carrier in contact with said planar lugs, said support means being spaced at a specific interval from said four side walls, the remaining two of said four side walls being opposed to each other and one of said two remaining side walls being located at an insertion side of the information recording carrier holding frame for insertion of the information recording carrier, and
   a portion of said support means located furthest away from said one wall located at said insertion side being located further away from said one wall located at said insertion side than a portion of said planar lugs located closest to said one wall located at said insertion side to provide a fulcrum point about which the information recording carrier is pivoted to raise an edge of said information recording carrier above said one wall located at said insertion side for removal of the information recording carrier from said information recording carrier-holding frame.

2. An information recording carrier-holding frame according to claim 1, wherein said support means includes two rows of supports which both extend parallel to said remaining two side walls portions of said depression peripheral wall.

3. An information recording carrier-holding frame according to claim 2, wherein a depression is defined on an upper face of each of said support means.

4. An information recording carrier-holding frame according to claim 1, wherein said frame is integrally formed from a synthetic resin sheet through molding.

5. An information recording carrierholding sheet having a plurality of information recording carrier-holding frames arrayed in plural rows and plural columns, said information recording carrier-holding frames comprising:
   a file sheet including a substantially perpendicular depression peripheral wall defining a rectangular depression having a bottom wall and four side walls;
   planar lugs projecting inwardly from two of said four side walls, said two side walls being opposed to each other;
   support means rising from said bottom wall for supporting an information recording carrier in contact with said planar lugs, said support means being spaced at a specific interval from said four side walls, the remaining two of said four side walls being opposed to each other and one of said two remaining side walls being located at an insertion side of the information recording carrier holding frame for insertion of the information recording carrier, and
   a portion of said support means located furthest away from said one wall located at said insertion side being located further away from said one wall located at said insertion side than a portion of said planar lugs located closest to said one wall located at said insertion side to provide a fulcrum point about which the information recording carrier is pivoted to raise an edge of said information recording carrier above said one wall located at said insertion side for removal of the information recording carrier from said information recording carrier-holding frame.

6. An information recording carrier-holding sheet according to claim 5, wherein said support means includes two rows of supports which both extend parallel to said remaining two side walls.

7. An information recording carrier-holding sheet according to claim 5, wherein said frame is integrally formed from a synthetic resin sheet through molding.

* * * * *